US007687000B2

(12) United States Patent
Gaudoin

(10) Patent No.: US 7,687,000 B2
(45) Date of Patent: Mar. 30, 2010

(54) METHOD FOR THE PRODUCTION OF INDIVIDUAL COMPONENTS

(76) Inventor: Marcus Gaudoin, Gewerbe Park 28, Neuhausen ob Eck (DE) 78579

( * ) Notice: Subject to any disclaimer, the term of this patent is extended or adjusted under 35 U.S.C. 154(b) by 197 days.

(21) Appl. No.: 11/690,902

(22) Filed: Mar. 26, 2007

(65) Prior Publication Data

US 2007/0187865 A1 Aug. 16, 2007

Related U.S. Application Data

(63) Continuation of application No. PCT/DE2005/001697, filed on Sep. 25, 2005.

(30) Foreign Application Priority Data

Sep. 25, 2004 (DE) ...................... 10 2004 046 648

(51) Int. Cl.
*B29C 41/00* (2006.01)

(52) U.S. Cl. ...................................................... 264/255

(58) Field of Classification Search .................. 264/255
See application file for complete search history.

(56) References Cited

U.S. PATENT DOCUMENTS 4,381,328 A * 4/1983 Bunner et al. ............... 428/171
5,213,732 A 5/1993 Jevtic
5,836,265 A 11/1998 Barber et al.
5,849,229 A * 12/1998 Holtzberg .................. 264/102
6,755,997 B2 * 6/2004 Gebreselassie et al. ..... 264/40.1
2003/0072934 A1 * 4/2003 Koolhaas ................ 428/304.4

FOREIGN PATENT DOCUMENTS

DE 938 775 2/1956
DE 195 04 782 C2 8/1999
DE 1 022 276 7/2004
WO 03/018274 3/2003

* cited by examiner

*Primary Examiner*—Joseph S Del Sole
*Assistant Examiner*—John P Robitaille
(74) *Attorney, Agent, or Firm*—Burr & Brown

(57) ABSTRACT

The invention relates to a method for the production of individual components made from materials which change state from a liquid to solid or a particulate to bonded state during the method. A mold and elastic balloons, which may be placed in the mold under pressure, are used for the method. Either gas or liquid or the liquid material of the component for production, which may later be hardened, are filled in the balloons.

1 Claim, 3 Drawing Sheets

METHOD FOR THE PRODUCTION OF INDIVIDUAL COMPONENTS

CROSS REFERENCE TO RELATED APPLICATION

This application is a continuation of International Application No. PCT/DE2005/001697 having an international filing date of Sep. 25, 2005, which designated the United States, and claims benefit under 35 USC §19(a)-(d) of German Application No. 10 2004 046 648.3, filed Sep. 25, 2004, the entireties of which are incorporated herein by reference.

FIELD OF THE INVENTION

The present invention relates to a method for the production of individual components made from materials which change their state from a liquid to a solid state or from a particulate to a bonded state during the method, or by the use of gases and liquids, which result in products by resorting to the use of a mold and elastic balloons, which are held in the cavity of the mold under the effect of pressure.

BACKGROUND OF THE INVENTION

DE/19504782C2 discloses the use of a flexible form in the manufacture of components, in particular in areas involving molding. These forms are easily removed from the model by undercutting. This method is used for surface copying.

Another known method for forming components is the lost wax technique. A plastic and wax mixture is made for the purpose of producing the positive form of the part to be cast. The part to be cast is surrounded by a casting envelope, and the plastic and wax mixture contained therein is evaporated by heat or is able to drain away via a channel. The casting envelope is subsequently irretrievably destroyed to permit the further processing of the casting.

When individual elements with recurring dimensions, surfaces and structures are selected in conjunction with the production of component parts, it is frequently necessary to adapt such elements locally to an existing design. A surface structure assembled from individual elements, of which one is not identical with the other, is only possible with considerable manual and technical effort when employing these known techniques.

SUMMARY OF THE INVENTION

Individual elements are made possible by the method of the present invention, which involves the use of materials which change their state from a liquid to a solid state or from a particulate to a bonded state, or by the use of gases and liquids, by resorting to the use of elastic balloons positioned in a mold having a mold cover. These balloons can be formed into individual elements according to their material composition, their filler, their filling quantity, the pressure exerted by the cover of the mold, the rigid or flexible nature of the mold, in conjunction with which one element influences the neighboring element in the course of deformation. These balloons function as an elastic skin that are influenced by internal and external forces to create the shapes of the elements.

BRIEF DESCRIPTION OF THE DRAWINGS

For a fuller understanding of the nature and objects of the invention, reference should be made to the following detailed description of a preferred mode of practicing the invention, read in connection with the accompanying drawings, in which.

DETAILED DESCRIPTION OF THE INVENTION

Example 1

Production of a Facade

Figure 1:
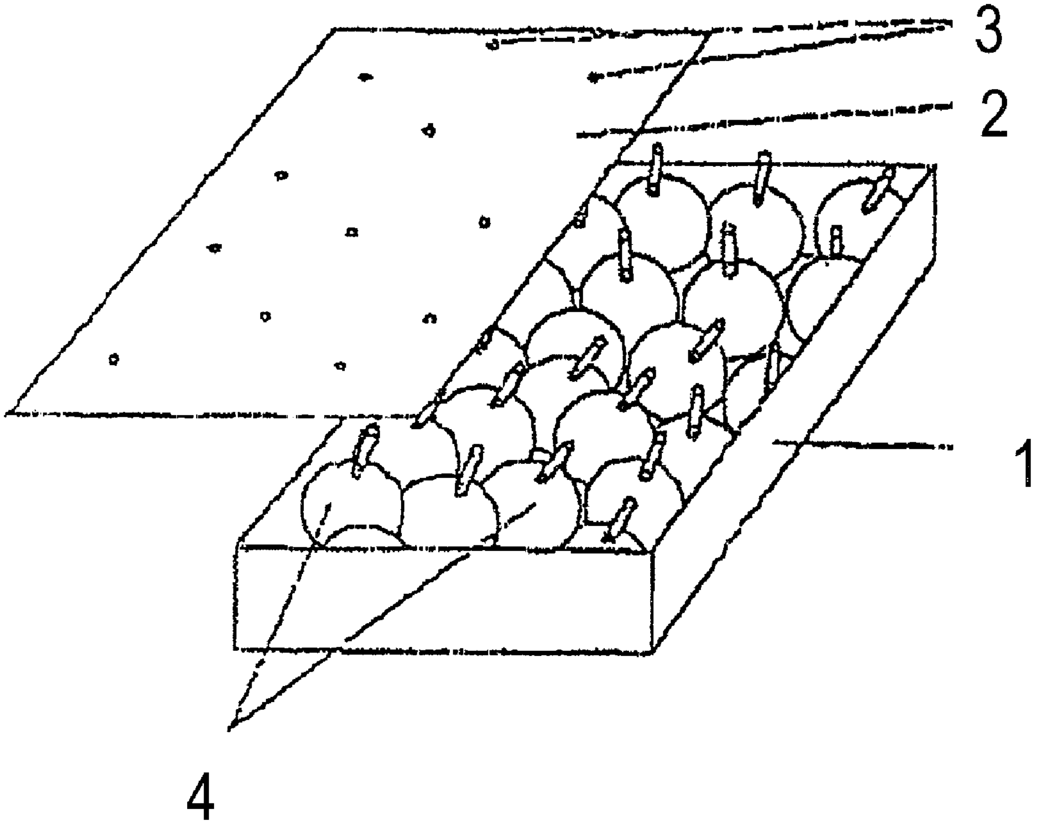
FIG. 1 shows a mold and mold cover for housing a plurality of closeable elastic balloons.
Figure 2:
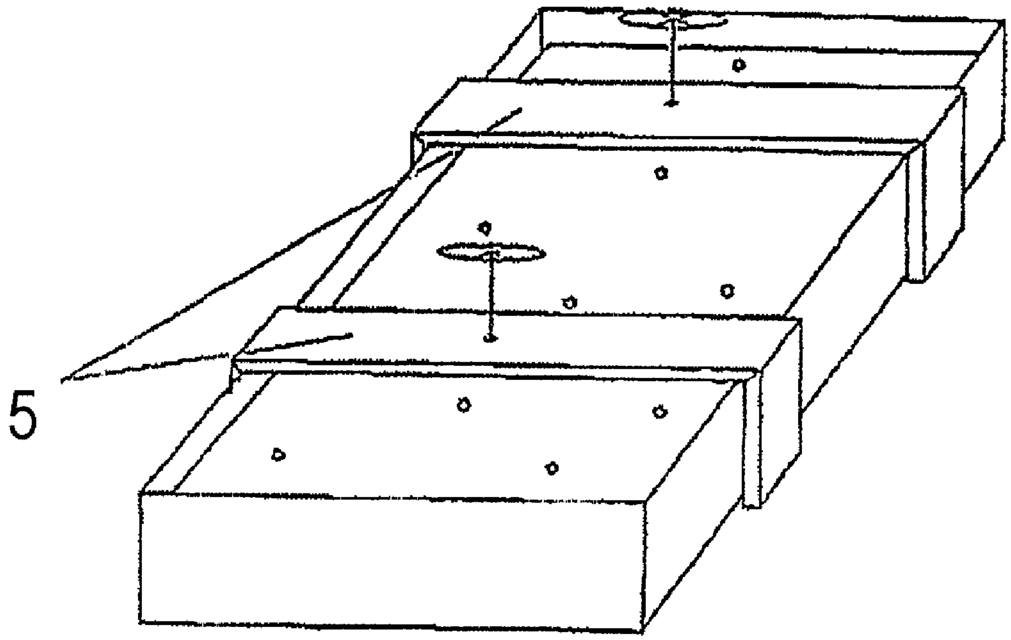
FIG. 2 shows the mold and mold cover held in a closed state via a clamping device.
Figure 3:
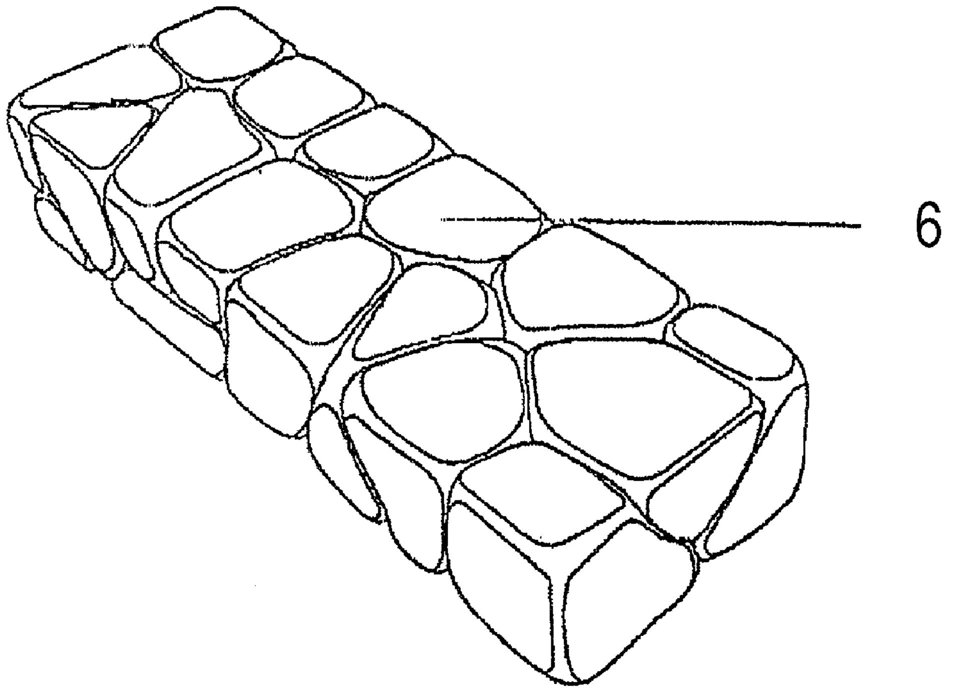
FIG. 3 shows a facade formed according to the method of the present invention.

1. A mold (FIG. 1/Item 1) with the desired dimensions is produced.
2. A mold cover (FIG. 1/Item 2) with the necessary dimensions is produced.
3. Elastic balloons (FIG. 1/Item 4) are filled with air, closed, and the outer skin is provided with a parting agent. The balloons are then positioned in the cavity of the mold.
4. The mold cover is laid on the mold to close the mold cavity and is secured to the mold with a clamping device (FIG. 2/Item 5).
5. The clamping device applies the desired pressure to the elastic balloons that are present in the mold cavity of the mold.
6. A tacky flexible filler is injected into the gaps between the compressed elastic balloons through feeders passing through the mold cover (FIG. 1/Item 3).
7. Following hardening of the filler, the clamping device is released and the mold cover is removed.
8. The elastic balloons are deflated and are removed from the mold cavity.
9. The mold is cleaned, and any filler adhering to the mold is removed, as appropriate.
10. The mold is provided with a parting agent.
11. The mold is filled with a desired material, and depending on the nature of the material, can be reinforced with woven mats, as appropriate.
12. Following hardening of the desired material, the mold is removed and the resulting facade (FIG. 3/Item 6) is cleaned.

Example 2

Production of Floor Panels

1. A mold with the desired dimensions is produced.
2. A mold cover with necessary dimensions is produced.
3. The inner skin of the elastic balloons is provided with a parting agent.
4. The elastic balloons are positioned in the mold cavity of the mold and are filled with the desired material by injection and then closed.
5. The filled balloons are aligned.
6. The mold cover is laid on the mold to close the mold cavity and is secured to the mold with a clamping device.
7. The clamping device applies the desired pressure to the elastic balloons that are present in the mold cavity of the mold.
8. Following hardening of the desired material filler to form a plurality of elements, the mold cover is taken off and the mold is removed.
9. The elastic balloons are deflated and are separated from each respective element.

10. The individual elements are cleaned and can then be laid on a floor, for example.

Example 3

Production of a Grip

1. An elastic balloon is filled with a thermosetting material.
2. The balloon is closed,
3. The balloon is now taken in the hand and molded to the desired form by muscle power.
4. After hardening of the thermosetting material, the pressure on the elastic balloon is released.
5. The elastic balloon is now removed from the hardened thermosetting material.
6. The resulting form can undergo further processing as required.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. A method for the production of a product made from product materials which change their state from a liquid to a solid state or from a particulate to a bonded state, said method comprising the steps of:

providing a mold having a mold cavity defining at least a portion of a shape of the product;

positioning a plurality of elastic, closeable balloons in the mold cavity;

filling the elastic balloons through their respective openings with a desired liquid or gas;

closing the openings of the balloons;

closing the mold cavity to compress the elastic balloons within the mold cavity;

injecting a liquid thermosetting material into the mold cavity so that the liquid thermosetting material fills spaces between the mold cavity and the elastic balloons in the mold cavity;

hardening the thermosetting material;

emptying and removing the elastic balloons from the mold cavity while allowing the hardened thermosetting material to remain in the mold cavity, so that the hardened thermosetting material in the mold cavity includes spaces created by the removal of the balloons from the hardened thermosetting material and the mold cavity;

adding a desired product material to the mold cavity to fill or line the spaces in the hardened thermosetting material within the mold cavity;

hardening the desired product material to form the product; and removing the product from the hardened thermosetting material and the mold cavity.

* * * * *